(12) United States Patent
Ouriev

(10) Patent No.: US 7,866,973 B2
(45) Date of Patent: Jan. 11, 2011

(54) DIE FOR FORMING EXTRUDATES OF VISCOELASTIC MATERIALS

(75) Inventor: Boris Ouriev, Niederuzwil (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 10/546,408

(22) PCT Filed: Feb. 6, 2004

(86) PCT No.: PCT/CH2004/000068

§ 371 (c)(1),
(2), (4) Date: May 15, 2006

(87) PCT Pub. No.: WO2004/080692

PCT Pub. Date: Sep. 23, 2004

(65) Prior Publication Data

US 2006/0210666 A1    Sep. 21, 2006

(30) Foreign Application Priority Data

Mar. 12, 2003 (DE) ................. 103 11 190

(51) Int. Cl.
*B29C 47/08* (2006.01)
*D01D 4/02* (2006.01)

(52) U.S. Cl. ............... 425/382 R; 425/382.2; 425/464

(58) Field of Classification Search ............ 425/382.2, 425/464, 382 R; 264/176.1, 177.13
See application file for complete search history.

(56) References Cited

U.S. PATENT DOCUMENTS

| | | | | |
|---|---|---|---|---|
| 2,403,476 A | * | 7/1946 | Berry et al. | 425/464 |
| 3,210,451 A | * | 10/1965 | Manning, Jr. et al. | 264/200 |
| 3,574,889 A | * | 4/1971 | Hire et al. | 425/382.2 |
| 3,938,925 A | * | 2/1976 | Lees | 425/464 |
| 4,056,597 A | * | 11/1977 | Cooper | 264/169 |
| 4,071,307 A | * | 1/1978 | Porro | 425/72.2 |
| 4,376,747 A | * | 3/1983 | Nazem | 264/29.2 |
| 5,192,543 A | * | 3/1993 | Irvin et al. | 425/378.1 |

FOREIGN PATENT DOCUMENTS

| | | | |
|---|---|---|---|
| FR | 893153 | * | 6/1944 |
| GB | 857808 | * | 1/1961 |

* cited by examiner

*Primary Examiner*—Yogendra N Gupta
*Assistant Examiner*—Joseph Leyson
(74) *Attorney, Agent, or Firm*—Francis C. Hand; Carella, Byrne, Cecchi

(57) ABSTRACT

The invention relates to a die assembly(1) for forming extrudates of viscoelastic masses, e.g. polymers, dough masses etc, comprising several similar parallel die channels (2), each extending through the die assembly (1) in the axial transport direction (F) of the mass. According to the invention, a respective partition (5), which runs parallel with the axial transport direction (F) and is equipped with a cutting edge (5a) on its upstream end, is provided on the upstream end of the die body (1) between two adjacent inlet openings (3).

17 Claims, 4 Drawing Sheets

DIE FOR FORMING EXTRUDATES OF VISCOELASTIC MATERIALS

The invention relates to a die arrangement and strand extrusion method for viscoelastic material.

Strand extrusion die arrangements for viscoelastic materials, in particular polymers, pastas, etc., are known in the art. As a rule, they are equipped with several mutually parallel, identical die canals, which extend through the die of one respective inlet opening to a respective outlet opening, wherein the respective die canals each have an inlet area at the upstream end of the die canal and an outlet area at the downstream end of the die canal in the axial conveying direction of the material. The inlet openings are adjacent to each other.

When extruding strands of viscoelastic materials, e.g., pastas, polymers, these materials are formed. However, forming requires that the material flow. The material can also tear at specific points. Due to the elastic properties of the viscoelastic material, mechanical material stresses also arise in such a viscoelastic material in the forming and tearing process, which continue in the formed material. After the process of forming the material is complete, this can lead to additional, apparently spontaneous deformations. In this conjunction, reference is often made to "dimensional memory", because the mechanical material stresses of the material exiting the forming device give the impression that it "remembers" a previous shape, and wants to return to it. While extruding strands of pastas or polymers with die arrangement, this can lead to a crimping of the strands exiting the individual die canals. The stresses are here introduced in the material during the division and distribution of the material to the various die canals on the one hand, and as the material expands inside the die canal on the other. The stresses in the material arising from the division and separation of the material may have the most disruptive effect owing to their asymmetry relative to the formed strands. However, the material stresses and resultant tendency of the strands to change direction can also produce asymmetrical wall friction in the die canals, which can further enhance these material stresses under certain conditions. In any event, such strands consisting of viscoelastic materials tend to undergo the aforementioned crimping white exiting the die arrangement.

In addition, the extrusion of viscoelastic materials into strands requires the use of a relatively high amount of energy and a high pressure differential at the die arrangement in order to separate the material, distribute it to the forming die canals and finally extrude it through the forming die canals, during which the material is expanded. In other words, the conventional die arrangements used to form viscoelastic materials have a relatively high die resistance to such materials. This is especially problematical for pastas, since they offer only a limited possibility to reduce the die resistance and the stresses introduced into the material by way of an at least localized temperature increase in the die arrangement, if only confined primarily to the surface of the material, as opposed to classic polymers like polyester or rubber.

The object of the invention is to minimize such material stresses in viscoelastic materials while forming them into material strands, and to lower the energy outlay required for strand extrusion or the pressure differential, i.e., die resistance, required for this purpose.

This object is achieved according to the invention in the die arrangement described at the outset by arranging a separating wall running parallel to the axial conveying direction F at the upstream end of the die body between two respectively adjacent inlet openings, wherein the upstream end of the separating wall has a cutting edge.

If a viscoelastic material, e.g., a polymer material or pasta, etc., impacts the die arrangement according to the invention, the product stream supplied in the casing along the conveying direction F is divided into several partial streams, of which one flows through one of the several die canals. The sharp cutting edges break up the product stream supplied to the die arrangement into several partial streams already before it enters the several die canals. Since each cutting edge represents only a very small working surface for the product, a localized, very large force is exerted on the supplied viscoelastic product at the cutting edge. This gives rise to a locally concentrated shearing force along the cutting edges, which separates the product. However, before the viscoelastic product supplied to the cutting edges tears away on the cutting edges, it is deformed until it reaches its ultimate tensile stress and breaking elongation, wherein the potential energy is stored in the viscoelastic material, and relayed to the several partial streams. As a whole, however, the stresses introduced into the material while separating and distributing the viscoelastic material to the several die canals via the cutting edges are distinctly lower than in a conventional die arrangement without sharp cutting edges, so that far less content gets into the dimensional memory of the viscoelastic material while the viscoelastic material supplied to the die arrangement according to the invention is distributed into several partial strands already, thereby significantly reducing the deformational tendency of the product strands (crimping, etc.) as they exit the die canals, along with the die resistance. These positive effects are especially pronounced for pasta die arrangements.

The area situated upstream from the inlet area of each of the adjacent inlet openings is preferably completely enveloped by separating walls running parallel to the axial conveying direction, the upstream end of which is designed as the respective cutting edge. As a result, material entering the respective die canals is cut at practically every point where it still requires separation, so that exceedingly low stresses are introduced into the material.

The cutting edges can form an angle differing from the axial conveying direction of the material by 90°. For example, they can be inclined at an angle of about 30 to 60° relative to the conveying direction of the material. However, an acute angle is preferred, since, the more acute the angle relative to the conveying direction, the greater the length $L_S$ as measured along the conveying direction of the area in which material is cut in a radial direction perpendicular to the conveying direction, e.g., from radially outward to radially inward. The radially outwardly streaming areas the material are then cut first, for example, while the radially inwardly streaming area of the material is cut later. However, the stresses introduced into the material in the cutting process have then already had a chance to abate in the radially outward areas. Hence, the cutting process again causes less stress to be introduced into the material distributed on the die canals overall than would be the case given cutting edges running at a right angle to the streaming direction (simple "cookie cutter" principle).

The outlet area from the inner die canal area toward the outlet opening advantageously expands like a bell over a length $L_A$ along the axial conveying direction F, wherein the expansion angle of the outlet widening measured between the axial conveying direction and the inner wall of the canal outlet area steadily increases along the axial conveying direction. In particular, the expansion angle can steadily continue to rise along the axial conveying direction, wherein the expansion angle of 0° inside the die increases up to 90° at the downstream end of the die body. In this case, the pattern followed by widening in a longitudinal section can resemble a circle, for example, whose bending radius $R_A$ is greater than the radius $R_K$ of the inner die canal area. This curved, expanded outlet area replaced the edge of conventional outlet openings with a curved, continuous transition from a vertical tangent inside the die canal to a tangent at the downstream end of the outlet area that runs at an incline, in extreme cases horizontally, relative to the vertical line.

When a viscoelastic material, e.g., a polymer or pasta, etc., impacts the die canal of the die arrangement according to the invention, the product stream divided into several partial streams is pressed through the several die canals. Stresses arise in the material as it enters the die canal and during the forming process in the inlet area. Any stresses that built up in the material and had not yet abated on the cutting edges during the cutting process and/or in the die canals during an expansion are then practically completely relaxed in the expanding outlet area. In this die geometry, the several small product strands hence exit the respective die canals practically stress-free. The expanded outlet area allows the product to relax in both an axial and radial direction. This prevents fluting ("shark skin") on the surface in the viscoelastic product strands exiting the die canals.

In a special embodiment, the die canal inner wall in the outlet area can have a higher surface roughness over a length $L_R$ along the axial conveying direction than the remaining die canal inner wall. This makes it possible to specifically influence the surface of the product through the selection of roughness and/or the material of the roughened area.

It is also advantageous for the inlet area of the die canals to be expanded from the inner area toward the inlet opening opposite the axial conveying direction F along a length $L_E$, wherein the expansion angle of the inlet widening measured between the axial conveying direction and the inner wall of the canal inlet area ranges from 5° to 45°, but preferably from 8° to 25°. From a production standpoint, it is especially easy to have the expansion angle be constant from the inner area to the inlet opening, i.e., for a conical inlet expansion to be present. As a result, a "soft" expansion, i.e., one sufficiently slow for the viscoelastic material, can be achieved even at relatively high conveying speeds of the material, meaning that the relaxation time of the viscoelastic material is less than the duration of material expansion in the inlet widening.

The die arrangement is best designed in such a way as to give the die canal a circular cross section along its entire length. As a result, the same boundary conditions are in place everywhere on the walls, yielding a uniform and maximally symmetrical expansion.

A compact structural design of the die arrangement is characterized in that the axial length of the canal inlet area measures between 50% and 80% of the overall length of the nozzle canal.

At least partial areas of the inner walls of the die canal consist of polytetrafluoroethylene or similar material, to prevent adherence of the viscoelastic material to the inner walls and sliding friction thereupon.

In the strand extrusion method for the mentioned viscoelastic materials, in particular polymers, pastas, etc., involving the use of the die arrangement described above, the viscoelastic material is pressed through the die arrangement by means of a pressure gradient $\Delta p$ between the upstream end and the downstream end of the die arrangement. According to the invention, the pressure gradient $\Delta p$ is here selected in such a way that the condition $F < L/T_{RELAX}$ is satisfied by the flow rate $V_F$ of the viscoelastic material along the conveying direction F in a respective axial partial area of the die arrangement in which at least a portion of the material forming required for strand extrusion takes place, wherein $T_{RELAX}$ is the relaxation time of the viscoelastic material, and L ($=L_S$, $L_E$, $L_A$) is the axial length of the respective axial partial area of the die arrangement.

This ensures that the material will always have enough time to relax in the individual forming steps for the viscoelastic material required for strand extrusion, e.g., cutting along a length $L_S$ at the cutting edges, expansion along a length $L_E$ of the inlet widening, and final relaxation along the length $L_A$ of the outlet widening, so that the material has practically no more stress while exiting at the end of the die arrangement according to the invention.

In order to make optimal use of the roughened axial partial area mentioned further above, the flow rate $V_F$ of the viscoelastic material along the conveying direction F is adjusted to the length $L_R$ of the roughened axial partial area of the die arrangement in the method according to the invention in such a way as to satisfy the condition $V_F > L_R/T_{RELAX}$, wherein $T_{RELAX}$ is the relaxation time of the viscoelastic material, and $L_R$ is the axial length of the roughened partial area.

Hence, the axial length $L_R$ of the rough area is preferably smaller than the axial length $L_A$ of the outlet widening, smaller than the axial length $L_E$ of the inlet widening, and smaller than the axial length $L_S$ of the cutting edges.

However, it is also advantageous to provide large axial partial areas of the die canals with several sequentially rowed areas that each satisfy the condition $V_F > L_R/T_{RELAX}$. The interaction between wall adhesion and wall slippage (adhesion/sliding effect) can be influenced in this way. For example, the periodicity or spatial frequency of the rough axial wall sections of length $L_R$ and the flow rate make it possible to specifically generate more wall tears per unit of time, i.e., a highly frequent adhesion/sliding effect is "artificially" forced into being by the alternating relatively rough and relatively smooth wall sections. The advantage to this is that excessively high material stresses cannot build up, resulting in smaller tears in the product, if any.

Additional advantages, features and possible applications of the invention may be gleaned from the following description of preferred embodiments based on the drawing, which are not to be regarded as limiting in any way, wherein:

FIG. 8 illustrates a perspective view of one half of a modified die arrangement according to the invention; and FIG. 9 illustrates a perspective view of one half of a further modified die arrangement according to the invention.

Figure 1:
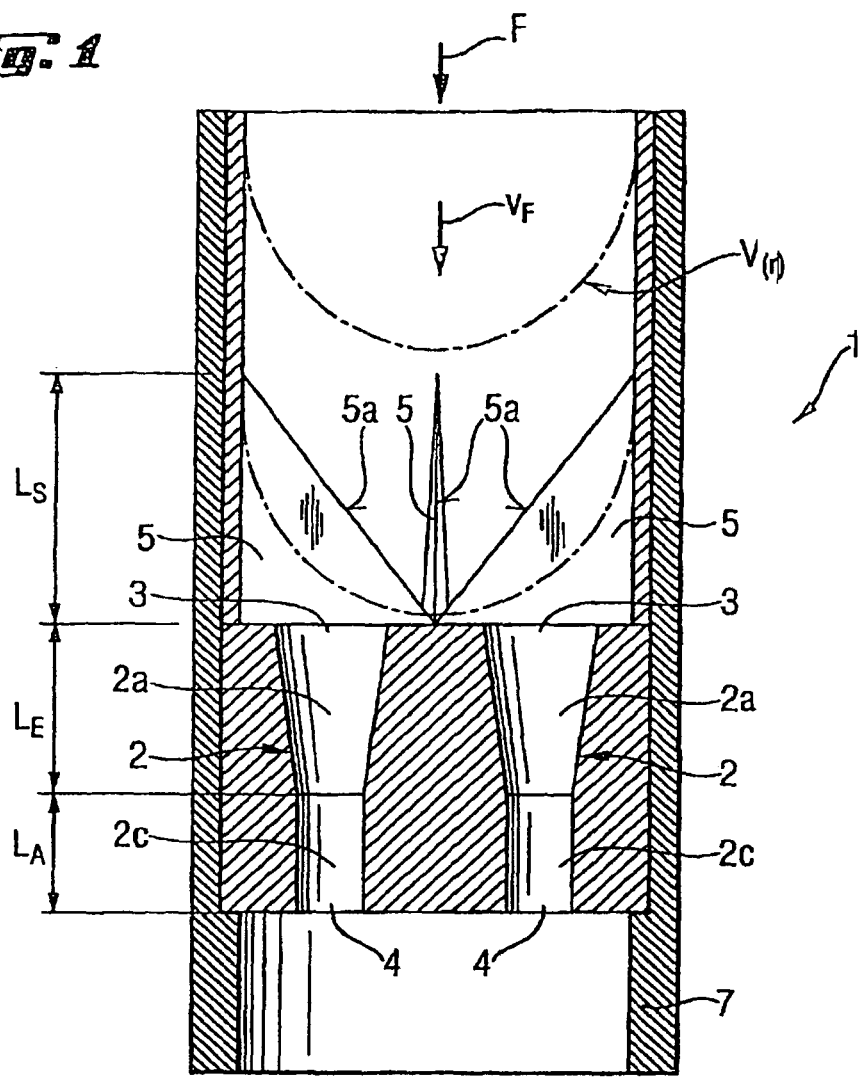
FIG. 1 shows a sectional view through a die arrangement according to the invention along the axial product conveying direction F.

FIG. 1 shows a sectional view through a die arrangement 1 designed especially for pasta used in noodle production along the axial product conveying direction F. The die arrangement 1 with a total of four die canals 2 (see FIG. 2) is accommodated in a cylindrical casing 7. An inlet opening 3 is located at the upstream end of each die canal 2, and an outlet opening 4 is located at the downstream end of each die canal 2. The inlet area 2a of each die canal adjacent to the inlet opening 3 is conically expanded, while the outlet area 2c is cylindrical. The expansion angle α (see FIG. 3) measures about 10-20°. The upstream end of the die arrangement 1 has four separating walls 5 (see FIG. 2), which run parallel to the axial conveying direction F, and divide the area upstream from the inlet openings 3 into four partial areas, which are each upstream from an inlet opening 3. The edges of the separating walls 5 facing opposite the axial conveying direction F are each designed as an inclined cutting edge 5a, which extend rectilinearly, as shown, from the inner wall of the casing 7 to the axis of the casing 7 both radially inward and in the conveying direction F.

The inlet area 2a may expand radially in a direction towards the inlet opening 3 on an expansion angle α of from 5° to 45°, and especially from 8° to 25° along the length $L_E$ of the inlet area 2a.

Figure 2:
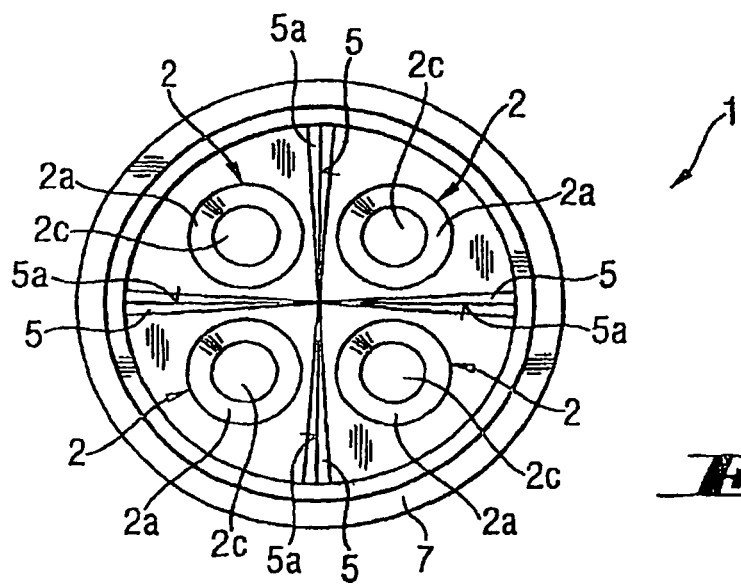
FIG. 2 shows a top view of the die arrangement according to the invention on FIG. 1 along the product conveying direction F.
Figure 7:
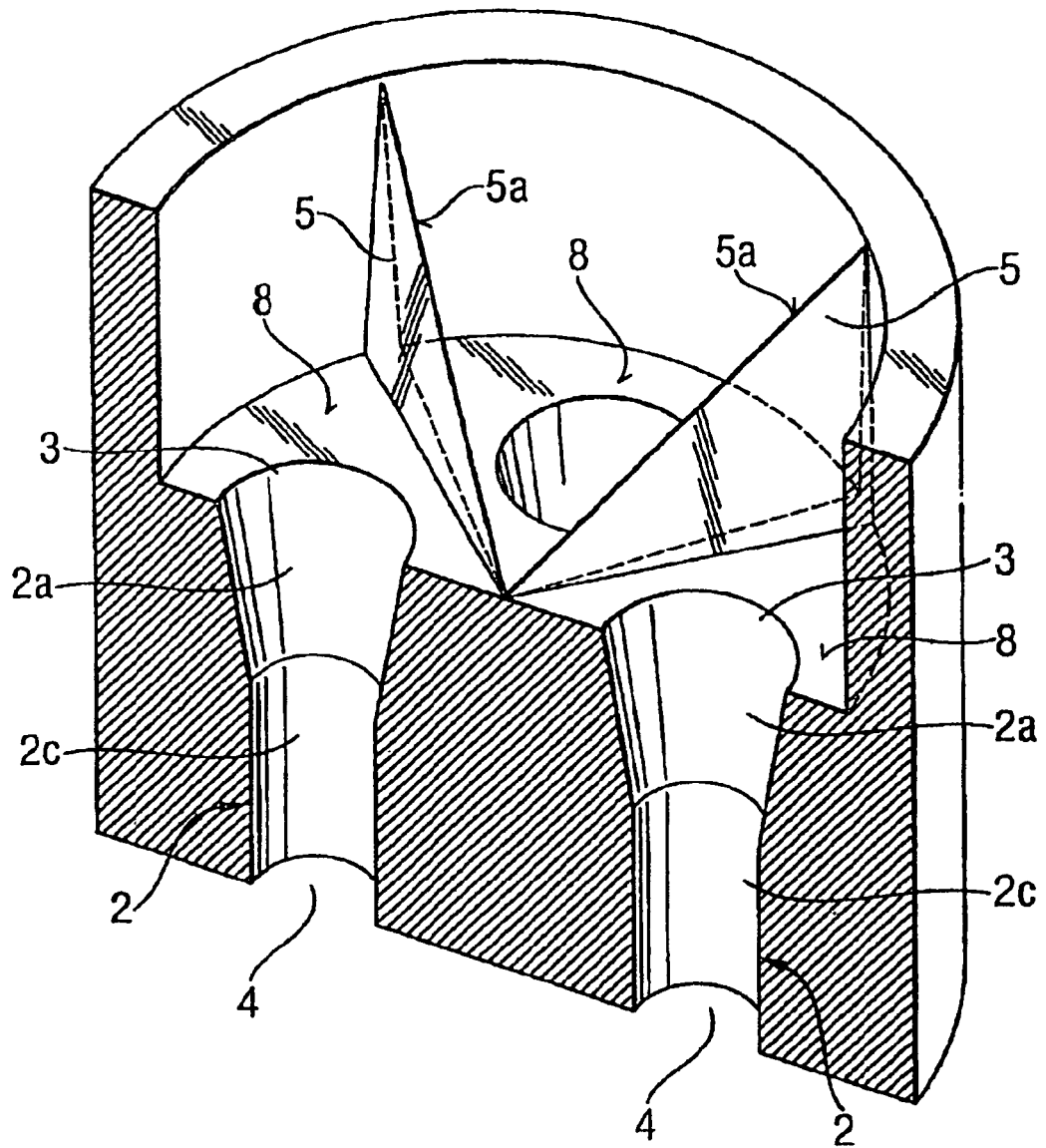
FIG. 7 illustrates a perspective view of one half of the die arrangement of FIG. 1 and FIG. 2.
Figure 4:
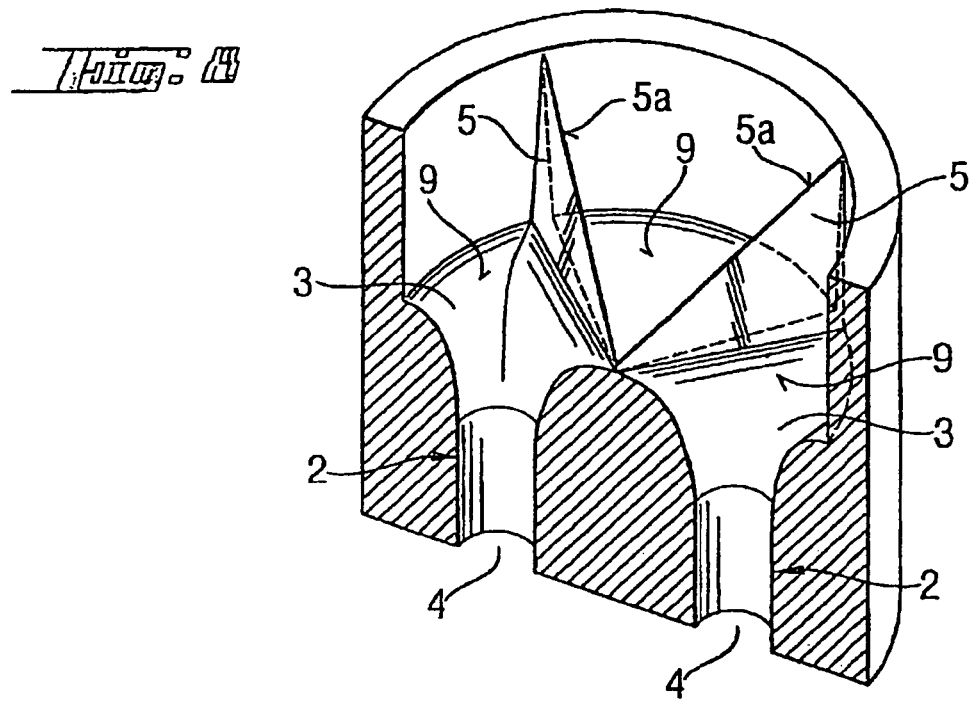
Figure 5:
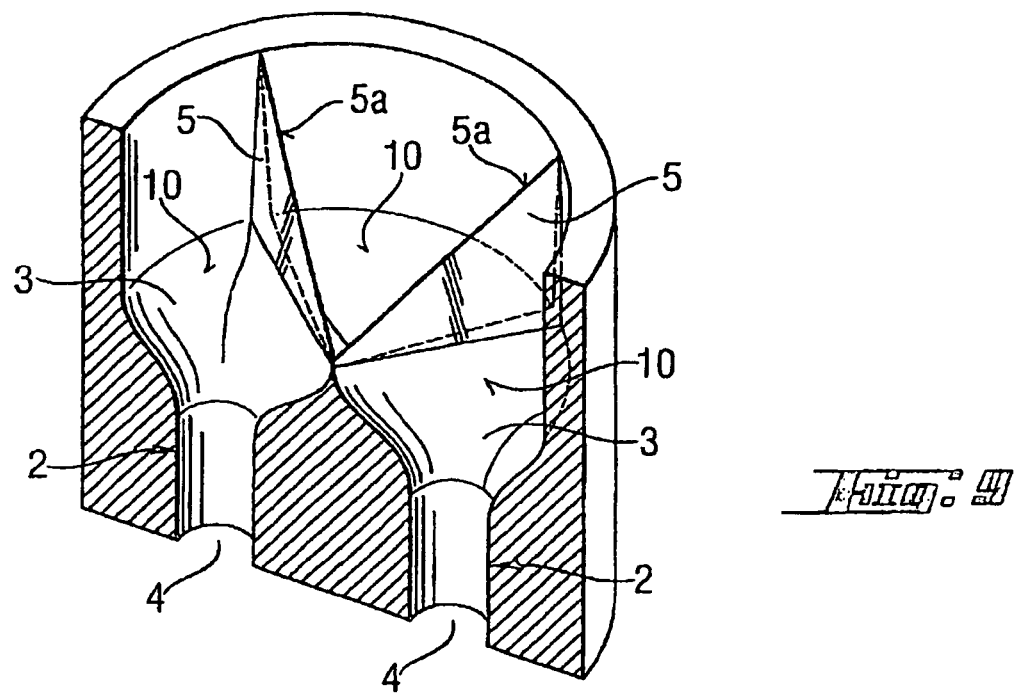

As shown in FIGS. 1, 2 and 7, the inclined cutting edges 5a extend rectilinearly from the inner wall of the casing 7.

As also shown in FIG. 1, the flow path within the casing 7 is uninterrupted upstream of the separating walls 5 relative to the flow of viscoelastic material.

FIG. 2 is a top view of the die arrangement 1 on FIG. 1 along the product conveying direction F (see FIG. 1). The four die canals 2 with their respective conically expanded inlet area 2a are evident, along with the separating walls 5 extending radially inward from the cylindrical casing 7, which divide the area above the die arrangement 1 into four partial areas. The four sharp cutting edges 5a extend at an inclination opposite the conveying direction F.

If a viscoelastic material, e.g., a polymer or pasta, etc., now impacts the die arrangement 1 according to the invention as schematically denoted by the flow profile V(r) on FIG. 1, the product stream supplied in the casing 7 along the conveying direction F is divided into four partial streams, of which one flows through each of the four die canals 2. The sharp cutting edges 5a separate the product stream supplied to the die arrangement 1 into four partial streams already before it enters the four die canals 2. Since each cutting edge 5a represents only a very small working surface for the product opposite the conveying direction F, a localized, very large force is exerted at the cutting edge 5a on the viscoelastic product that impacts the cutting edge 5a. A locally concentrated shearing force arises along the cutting edges 5a, which separates the product. However, before the viscoelastic product supplied to the cutting edges 5a tears away on the cutting edge, it is deformed until it reaches its breaking elongation, wherein potential energy is stored in the viscoelastic material, and relayed to the four partial streams, resulting in a partial relaxation in these four partial streams until further deformation or shaping of the viscoelastic material takes place in the four product partial streams once the material enters the respective die canals 2. Here as well, stresses arise in the material as it enters into the die canals 2 and is formed in the respective inlet areas 2a. However, these are less than at the cutting edges 5a, and do not result in the product being torn off.

As opposed to conventional die arrangements without cutting edges and without any conical expansion having an expansion angle according to the invention of about 10-20°, laying out the cutting edges 5a of the separating walls 5 and the inlet areas 2a of the die canals 2 as described in the invention reduces the scope of stresses arising in the material conveyed through the die arrangement 1 according to the invention and formed therein, along with the flow resistance of the die arrangement 1.

The reason is that the process of converting one large product strand into four small ones that is associated with a buildup of material stresses essentially takes place in two steps in the die arrangement 1 according to the invention. In a first step, the large product strand is cut into four small partial strands at the cutting edges 5a. In a second step, the four partial strands are then expanded in the conical inlet areas 2a. Immediately after the first step (cutting at the cutting edges 5a) and still before the second step (expansion in the inlet area 2a), a partial relaxation (stress abatement, degradation of potential energy) takes place in the material as it glides along the separating walls 5. When the product is then expanded in the conical inlet areas 2a, material stresses also build up, whereupon an at least partial relaxation again takes place in the adjoining cylindrical outlet areas 2c. As a result, the viscoelastic material divided into four small product strands exits the outlet openings 4 of the die canals 2 under practically no stress, so that the four exiting product strands experience no noteworthy deformations (e.g., crimping). Since the product already tears at far lower product shear forces owing to the cutting edges, the flow resistance of the die arrangement 1 according to the invention is also tangibly reduced.

Hence, the die arrangement 1 according to the invention enables operation at a lower pressure differential relative to conventional die arrangements, i.e., at a lower pressure gradient in the product along the die arrangement 1, while practically completely "erasing" the dimensional memory in the exiting partial product strands.

Figure 3:
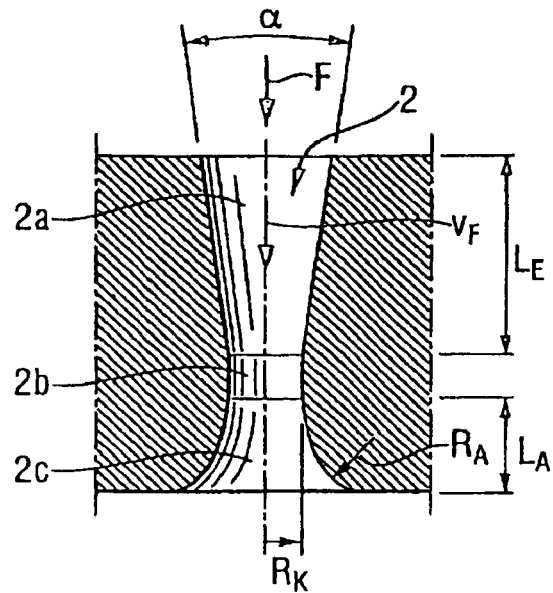
FIG. 3 shows a sectional view through a die canal according to the invention along the axial product conveying direction F.

FIG. 3 shows a sectional view through a die canal 2 also designed especially for pasta used in noodle production along the axial product conveying direction F. This die canal 2 can be used to replace the die canals 2 shown on FIG. 1. Instead of the cylindrical outlet area 2c of the die canal 2 on FIG. 1, the inlet area 2a is followed downstream by a relatively short cylindrical inner area 2b followed by an outlet area 2c expanded like a bell. This outlet area 2c replaces the edge of the outlet opening 4 (see FIG. 1) with a curved, continuous transition from a vertical tangent on the inside 2b of the die canal 2 to a horizontal tangent at the downstream end of the outlet area 2c. The bending radius RA of the outlet widening decreases continuously toward the outlet opening 4, i.e., a bell-shaped expansion with a curve tapering toward the outlet opening 4 is present.

If a viscoelastic material, e.g., a polymer or pasta, etc., now impacts the die canal 2 of the die arrangement 1 according to the invention as described on FIG. 1, the product stream divided into four partial streams is pressed through the four die canals 2 (see FIGS. 1 and 2). As on FIG. 1, stresses arise in the material as it enters into the die canal 2 and is formed in the inlet area 2a. Any stresses that built up in the material and had not yet relaxed during the first step (cutting at cutting edges 5a) and/or during the second step (expansion in the inlet area 2a) are then practically completely relaxed in the expanding outlet area 2c here too. In this die geometry as well, the several small product strands hence exit the respective die canals 2 practically stress-free. One special advantage to the expanded outlet area 2c is here that it allows the product to relax in both an axial and radial direction. This prevents fluting ("shark skin") on the surface in the viscoelastic product strands exiting the die canals 2, which are practically always encountered given a sharp-edged outlet opening 4 at a cylindrical outlet area 2c (see FIG. 1).

The axial length of the relaxation areas shown on FIG. 1 and FIG. 3, which are essentially formed by the axial length $L_S$ of the cutting edge $5a$ and the axial length $L_A$ of the outlet area $2c$, along with the maximum flow rate $V_F$ of the viscoelastic material along the product conveying direction F are preferably adjusted to the relaxation time $T_{RELAX}$ of the product material in such a way as to give the material enough time as it passes through the respective relaxation areas to abate the stresses previously built up therein, i.e., $V_F \times T_{RELAX} < L_S$ or $V_F \times T_{RELAX} < L_A$.

Using the die canals 2 with the conical inlet area 2a and the bell-shaped outlet area 2c on FIG. 3 in the die arrangement 1 equipped with cutting edges 5a not only enables a lower pressure gradient in the product along the die arrangement 1 and a practically complete "erasure" of the volume-dimensional memory in the exiting partial product strands, but also an "erasure" of the surface-dimensional memory of these product strands.

Another advantage to the bell-shaped outlet area 2c of the die canals is that it permits a smooth transition from the stream with a parabolic velocity profile present inside the die canals 2 to the "stream" with a constant velocity profile present outside the die canals 2, i.e., the moving strand. This makes it possible to avoid tearing on the surface of the strands exiting the die canals 2.

Figure 4:
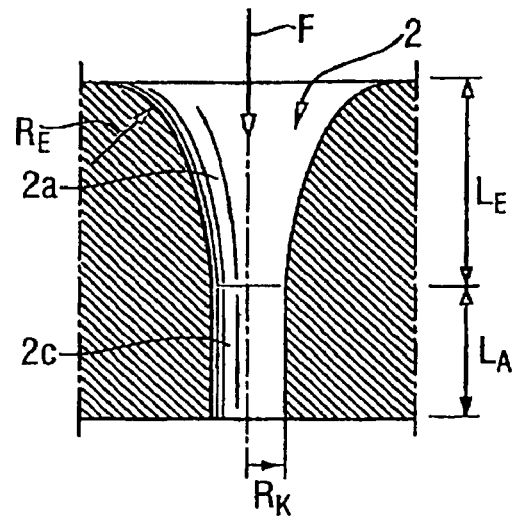
FIG. 4 shows a sectional view through another die canal according to the invention along the axial product conveying direction F.

FIG. 4 is a sectional view through another die canal 2 according to the invention made especially for pasta used in noodle production along the axial product conveying direction F. The inlet area 2a of the die canal 2 adjoining the inlet opening 3 is expanded in the shape of a bell, while the outlet area 2c is cylindrical. The bending radius $R_E$ of the inlet expansion is smallest at the inlet opening 3, and becomes greater with increasing penetration depth along the die canal 2, finally tangentially passing over into the cylindrical outlet area 2c.

Similarly to the bell-shaped outlet area, the inlet area 2a expanded in the shape of a bell helps ensure that the product is processed with care. Abrupt velocity changes that most often result in tears in the product are voided by the smooth acceleration of the product in the bell-shaped, expanded inlet area 2a, thereby ensuring a smooth transition from a stream with a constant velocity profile upstream from the die canals 2 to a stream with a parabolic velocity profile inside the die canals 2 in this case as well.

Figure 5:
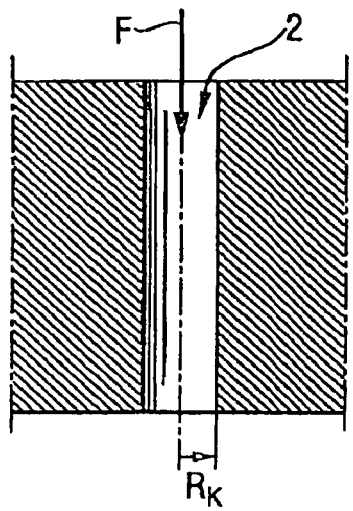
FIG. 5 shows a sectional view through a die canal according to prior art along the axial product conveying direction F.

FIG. 5 is a sectional view through a die canal 2 from prior art along the axial product conveying direction F. The die canal is designed as a cylinder with a constant radius $R_K$ from its inlet opening 3 up to its outlet opening 4.

Figure 6:
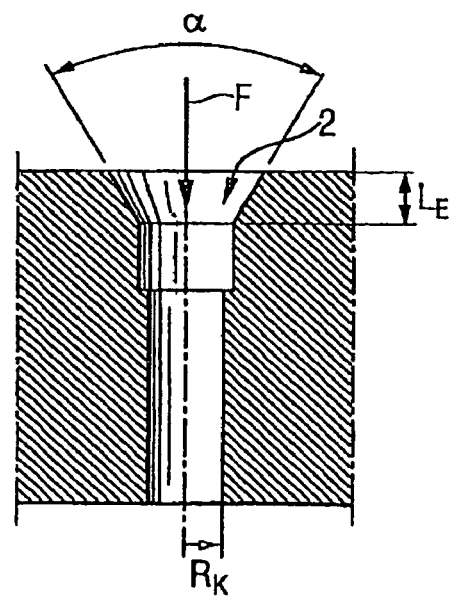
FIG. 6 shows a sectional view through another die canal according to prior art along the axial product conveying direction F.

FIG. 6 is a sectional view through another die canal 2 from prior art along the axial product conveying direction F. The inlet area 2a has a much greater expansion angle α relative to the invention, and has a far shorter length $L_E$ than in the invention.

FIG. 7 is a perspective of half the first embodiment of the die arrangement according to the invention shown on FIG. 1 and FIG. 2. A flat shoulder surface extends perpendicular to the conveying direction F between the inlet openings 3 of the die canals 2 and the separating walls 5 with its respective cutting edges 5a. The cutting edges 5a running inclined to the conveying direction F significantly decrease the flow resistance caused by the flat shoulder surface 8. The embodiment shown on FIG. 7 can be fabricated in an especially advantageous manner by machining with rotating tools.

FIG. 8 shows a perspective view corresponding to FIG. 7 of a second embodiment of the die arrangement according to the invention. However, it differs from the first embodiment on FIG. 7 in that the inlet opening 3 of the die canal 2 and the flat shoulder surface 8 of the first embodiment on FIG. 7 are formed by a singly curved transitional surface 9. This helps to further reduce the flow resistance of the die arrangement according to this second embodiment.

FIG. 9 shows a perspective view corresponding to FIG. 7 and FIG. 8 of a third embodiment of the die arrangement according to the invention. A doubly curved transitional surface 10 is here used in place of the singly curved transitional surface 9 on FIG. 8, replacing the flat shoulder surface 8 and the inlet opening 3 of the die canal 2 in the embodiment on FIG. 7.

Depending on the type of viscoelastic material to be processed, the singly curved transitional surface 9 or doubly curved transitional surface 10 achieves a further reduction in flow resistance relative to the embodiment shown on FIG. 7. While the embodiment on FIG. 7 is preferably fabricated by machining with rotating tools, the embodiments on FIG. 8 and FIG. 9 can preferably be manufactured with casting methods. The separating walls 5 with their cutting edges 5a are inserted into the machined die body after the fact in the embodiment on FIG. 7. In the embodiments on FIG. 8 and FIG. 9, the separating walls 5 can already be generated when casting the die body, so that they are integral with the die body, or they can be incorporated into the cast die body after the fact, similarly to the embodiment on FIG. 7.

Preferred materials for the die body include metals or plastics, in particular materials with an inside polytetrafluoroethylene coating, while the separating walls are preferably made of metal.

REFERENCE LIST

1 Die arrangement
2 Die canal
2a Inlet area of die canal
2b Inner area of die canal
2c Outlet area of die canal
3 Inlet opening of die canal
4 Outlet opening of die canal
5 Separating wall
5a Cutting edge
7 Casing
8 Flat shoulder surface
9 Singly curved transitional surface
10 Doubly curved transitional surface
F Conveying direction
LS Axial expansion of cutting edge
LE Axial expansion of inlet widening
LA Axial expansion of outlet widening
RK Bending radius of die canal cross section
RE Bending radius of inlet widening
RA Bending radius of outlet widening
vF Flow velocity of viscoelastic material
α Expansion angle

The invention claimed is:

1. In combination
  a casing having a cylindrical wall about a longitudinal axis to define a flow path for conveying a flow of viscoelastic material in a direction parallel to said axis;
  a die arrangement disposed within said wall of said casing and including a plurality of parallel canals for extrusion of the viscoelastic material therethrough, each said canal having an inlet opening at an upstream end relative to the flow of viscoelastic material, an outlet opening at an end opposite said upstream end, an inlet area adjacent said inlet opening and an outlet area adjacent said outlet opening; and
  a plurality of separating walls parallel to said axis and circumferentially spaced about said axis, each said separating wall extending radially inwardly from said wall of said casing to said axis and disposed between a respective adjacent pair of said canals, each said separating wall having a cutting edge at an upstream end thereof relative to the flow of viscoelastic material to separate the flow of viscoelastic material into partial streams, each said cutting edge extending rectilinearly from said wall of said casing to said axis.

2. The combination as set forth in claim 1 wherein
said inlet area expands radially in a direction towards said inlet opening on an expansion angle between a longitudinal axis of said inlet area and an inner surface of said inlet area of from 5° to 45°; and wherein said
plurality of separating walls extend axially from said inlet openings of said die arrangement.

3. The combination as set forth in claim 1 wherein each said cutting edge forms an acute angle with said axis.

4. The combination as set forth in claim 2 wherein said outlet area of at least one of said canals has a bell-shaped cross-section.

5. The combination as set forth in claim 4 wherein said outlet area has a continuously decreasing bending radius in a direction of said outlet opening.

6. The combination as set forth in claim 5 wherein each said canal has a cylindrical inner area of a predetermined radius and said bending radius is greater than said predetermined radius.

7. The combination as set forth in claim 4 wherein said outlet area has an expansion angle continuously increasing in a direction of said outlet opening from 0° within said die arrangement to 90° at said outlet opening.

8. The combination as set forth in claim 2 wherein said outlet area has a rough area extending from said outlet opening over an axial length less than the axial length of said outlet area.

9. The combination as set forth in claim 8 wherein said rough area has an axial length less than the axial length of said inlet area.

10. The combination as set forth in claim 2 wherein said expansion angle is constant to form a conical expansion.

11. The combination as set forth in claim 2 wherein each said canal has a circular cross-section throughout the length thereof.

12. The combination as set forth in claim 2 wherein said inlet area of each said canal has an axial length of from 50% to 80% of the axial length of said respective canal.

13. The combination as set forth in claim 2 wherein each said canal has a polytetrafluoroethylene coating on at least a portion of an inside surface thereof.

14. In combination
a casing having a smooth internal cylindrical wall about a longitudinal axis to define a flow path of circular cross-section for conveying a flow of viscoelastic material in a direction parallel to said axis;
a die arrangement disposed within said wall of said casing and including a plurality of parallel canals for extrusion of the viscoelastic material therethrough, each said canal having an inlet opening at an upstream end relative to the flow of viscoelastic material, an outlet opening at an end opposite said upstream end, an inlet area adjacent said inlet opening and an outlet area adjacent said outlet opening; and
a plurality of separating walls parallel to said axis and circumferentially spaced about said axis, each said separating wall extending radially inwardly from said wall of said casing to said axis and disposed between a respective adjacent pair of said canals, each said separating wall having a cutting edge at an upstream end thereof relative to the flow of viscoelastic material extending from said wall of said casing to said axis to separate the flow of viscoelastic material upstream of said die arrangement into partial streams prior to entry into a respective one of said canals each said cutting edge extending rectilinearly from said casing wall to said axis.

15. The combination as set forth in claim 14 wherein
said inlet area expands radially in a direction towards said inlet opening on an expansion angle between a longitudinal axis of said inlet area and an inner surface of said inlet area of from 5° to 45°; and wherein said
plurality of separating walls extend axially from said die arrangement.

16. The combination as set forth in claim 15 wherein said flow path within said casing is uninterrupted upstream of said separating walls relative to the flow of viscoelastic material.

17. The combination as set forth in claim 15 wherein said separating walls divide the area upstream from said canals relative to the flow of viscoelastic material into uninterrupted partial areas for the flow of a respective partial stream through each said partial area, each said partial area being disposed upstream of a respective inlet opening of a respective canal relative to the flow of viscoelastic material for the flow of a respective partial stream therethrough into said respective canal.

* * * * *